(No Model.)
C. H. LUCAS.
WATCH MAKER'S SCREW DRIVER.
No. 341,812. Patented May 11, 1886.
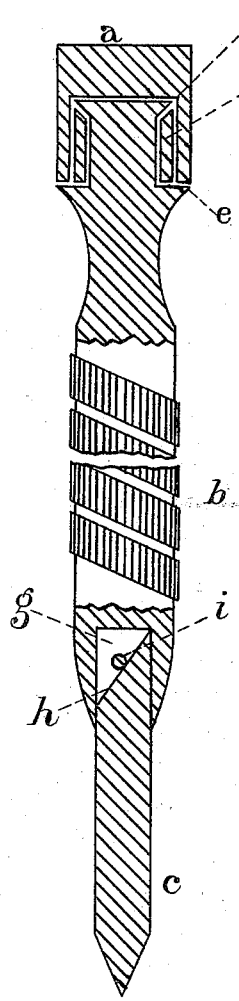
WITNESSES:
Edward B Cummings
John P. Kanigan
INVENTOR:
Charles H. Lucas
Per Atty
William Henry Clifford

UNITED STATES PATENT OFFICE.

CHARLES H. LUCAS, OF CANTON, MAINE.

WATCH-MAKER'S SCREW-DRIVER.

SPECIFICATION forming part of Letters Patent No. 341,812, dated May 11, 1886.

Application filed December 14, 1885. Serial No. 185,588. (No model.)

*To all whom it may concern:*

Be it known that I, CHARLES H. LUCAS, of Canton, in the county of Oxford and State of Maine, have invented certain new and useful Improvements in Screw-Drivers; and I do hereby declare that the following is a full, clear, and exact description of the invention, which will enable others skilled in the art to which it appertains to make and use the same, reference being had to the accompanying drawing, and to letters of reference marked thereon, which form a part of this specification.

The figure shows a side sectional elevation. Same letters show like parts.

My invention relates to watch-makers' and jewelers' screw-drivers. These, in watch making and repairing, are held by the thumb and fingers of one hand. The forefinger presses on the cap $a$. The thumb and middle finger grasp the handle at or near the middle (as at $b$) on the roughened or corrugated surface $b$. This is purposely made rough, so as to afford an easy and secure grasp for the thumb and middle finger. The screw-driving device $c$ is turned when and as this handle is turned. This is done by the thumb and middle finger. By these the handle is rotated while the forefinger is kept pressed on the cap $a$.

The manner of constructing the cap $a$ so that the handle $b$ can turn therein is as follows: The upper end of the handle is provided with a sleeve, $d$. This is prevented from slipping off in either direction by the shoulder $e$ under the bottom of the sleeve, and the flaring head $f$ at the top of the handle $b$. The sleeve $d$ is beveled at the top, to fit under the flaring head $f$, as illustrated in the drawing. The cap $a$ is hollowed out so as to fit nicely over the sleeve $d$. Thus the handle $b$ can be easily turned by the thumb and middle finger, and the cap is still held onto the upper end of the handle by its contact with the periphery of the sleeve $d$. The screw-driving device $c$ is fitted into a socket, $g$, in the lower end of the rotating handle $b$. The upper end of the screw-driver has a bevel, $h$, making a flat inclined surface. A pin, $i$, is driven through the handle $b$, and, bearing against the bevel $h$, prevents the screw-driver $c$ from turning in its socket.

What I claim as my invention, and desire to secure by Letters Patent of the United States, is—

The watch-maker's screw-driver $c$, having the handle $b$, provided with its roughened surface, the head $f$, cap $a$, sleeve $d$, bevel $h$, socket $g$, and pin $i$, as set forth.

In testimony that I claim the foregoing as my own I affix my signature in presence of two witnesses.

CHARLES H. LUCAS.

Witnesses:
JOHN P. KERRIGAN,
HERBERT M. SYLVESTER.